3,176,768
SAND CONSOLIDATION
Harry Brandt, Whittier, Phillip H. Parker, Jr., San Rafael, and Barney R. Treadway, Brea, Calif., assignors to California Research Corporation, San Francisco, Calif., a corporation of Delaware
No Drawing. Filed July 27, 1964, Ser. No. 385,498
20 Claims. (Cl. 166—33)

This is a continuation-in-part of copending application Serial No. 218,573, filed August 22, 1962, which in turn is a continuation-in-part of application Serial No. 59,168, filed September 29, 1960, now abandoned.

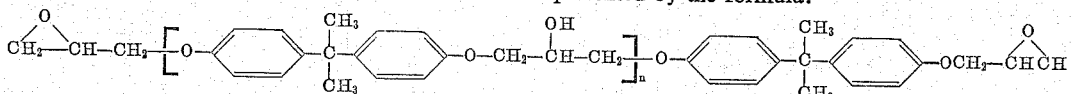

The present invention relates to a method of consolidating an incompetent earth formation of loose or unconsolidated sand or earth particles traversed by a well bore for the purpose of reducing or eliminating the invasion of particulate matter into the well bore during fluid production through the formation. More specifically, it is concerned with a sand consolidation method which involves injecting into the formation a plastic of the epoxy resin type, the method moreover being independent of the temperature characterizing the formation.

In plastic sand consolidation, two major, generally mutually exclusive, operating principles, or techniques, have been employed.

One technique involves filling all of the pores or spaces between sand particles with a consolidating plastic or resin, such as an epoxy resin, followed by flushing with a resin-immiscible fluid to displace excess resin while leaving a film of resin on the surface of the sand grains, the sand grains then becoming cemented to one another at the point of contact but having open spaces between them to provide for fluid flow.

Another technique of sand consolidation involves injecting into the formation a mixture of resin and an inert diluent therefor. While the volume of the mixture is sufficient to fill all the pores between sand particles, the volume contributed to by the resin itself is less than the pore volume of the formation to be treated. Resin is deposited on the surfaces of the sand particles, solidifies, and cements them together. The diluent is rejected and fills the spaces between particles, and upon fluid production is displaced with the producing fluid, permeability thus being established without resort to a flushing step.

In accordance with the present invention, a combination of the two methods described above is utilized.

In a first step there is injected into the formation to wet the sand grains a solution or mixture comprising, by weight, (1) about 40 to 95% of an epoxy resin having a molecular weight in about the range 400 to 700 and a viscosity above about 400 centipoises at the temperature of the formation to be treated, and (2) a normally liquid reactive diluent in an amount within about the range 5 to 60% to reduce the viscosity of the epoxy resin below about 400 centipoises and above about 25 centipoises at the temperature of the formation to be treated.

Following the injection step, a flushing operation is performed using a flushing fluid that is immiscible with the resin component but miscible with the reactive diluent component of the solution. The flushing step thus performs a dual function, i.e., to drive out excess resin solution between pores of the sand grains, and to extract the reactive diluent. As a result, permeability is effected and the sand grains are provided with a surface coating of resin.

Following the flushing step there is injected into the formation a curing agent to harden or solidify the resin. The curing agent also reacts with the reactive diluent, including that entrained in the resin on the sand, thus providing a consolidated sand mass of high compressive strength.

The epoxy resins suitable in the practice of the present invention are well known, and are commercially available, a common class being the diglycidyl ethers of bisphenol A, obtained by reacting epichlorohydrin with bisphenol A in the presence of caustic such as sodium hydroxide or potassium hydroxide. In general, these materials may be represented by the formula:

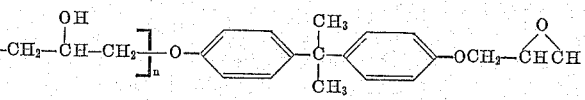

wherein $n$ is zero or an integer of 1 or higher number.

Generally, the epoxy resins are obtained as a mixture of monomeric epoxides ($n=0$) and of polymeric polyepoxides ($n \geq 1$). As is known in the art, by correlation of proportions of epichlorohydrin and bisphenol A, and caustic, the degree of polymerization can be controlled accordingly. Thus, increasing the epichlorohydrin to bisphenol A mol ratio, generally results in a mixture of polyepoxide having a lower average molecular weight. On the other hand, increasing the mol ratio of sodium hydroxide to epichlorohydrin generally results in a mixture of higher average molecular weight.

Also, as is known in the art, other halohydrins than epichlorohydrin, such as 1,2-dichloro-3-hydroxypropane, and dichlorohydrin, can be used.

Similarly, in place of bisphenol A there can be used mononuclear di- and trihydroxy phenols, such as resorcinol, hydroquinone, pyrocatechol, and phloroglucinol; polynuclear polyhydroxy phenols, such as 4,4'-dihydroxy diphenyl methane, trihydroxyl diphenyl dimethyl methane, and 4,4'-dihydroxy biphenyl.

Particularly useful hydroxyl intermediates and the ones preferred in carrying out the present invention are the polynuclear polyhydroxy phenols, also known as the novolac resins. Novolac resins containing 2 to 6, and as many as 12, phenolic hydroxyl groups per average moleclue have been proposed in the preparation of the type of resin herein contemplated, the use of resins containing a higher number of functional groups being here governed by the viscosity requirements hereinabove specified.

The novolac resins are well-known substances, and many are available commercially. Their preparation is described in the literature, such as in the book Phenoplasts, 1947, page 29 et seq., by T. S. Carswell. In general, these resins are prepared by condensing phenol with an aldehyde in the presence of an acid catalyst. Proportions of phenol and aldehyde in mol ratios of phenol to aldehyde greater than 1.1 and up to 2.5 are taught. As the aldehyde, formaldehyde is preferred, although the use of other aldehydes, such as acetaldehyde, chloral, butyraldehyde and furfural is permissible.

Similarly known is the condensation reaction of the epichlorohydrin with the novolac resin. The reaction is effected at a temperature in the range 140° F. to 300° F. between the novolac resin and at least about 3 mols of epichlorohydrin for each phenolic hydroxyl equivalent of the novolac resin, in the presence of about 1 mol of alkali metal hydroxide per phenolic hydroxyl equivalent of novolac resin. When the reaction is complete, the epoxy resin is isolated from the reaction mixture by removal of alkali metal salt, of unreacted alkali, epichlorohydrin and water, and purified.

As above indicated, epoxy resins of the type herein contemplated are available commercially. For example, a suitable material available commercially can be represented as follows:

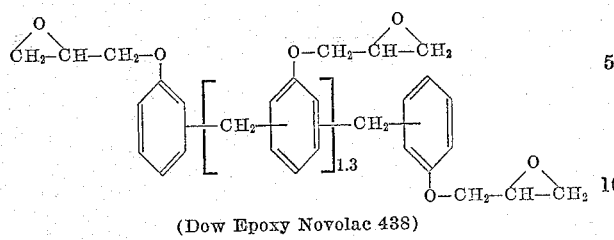

(Dow Epoxy Novolac 438)

An additional example of a suitable material available commercially is the following:

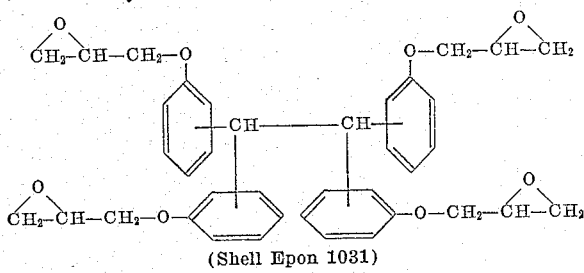

(Shell Epon 1031)

The reactive diluent component of the resin solution is a normally liquid monoepoxide, such as is derived from the reaction of epichlorohydrin and a monohydroxyl compound such as allyl alcohol, butyl alcohol and phenol to give, respectively, allyl glycidyl ether, butyl glycidyl ether and phenyl glycidyl ether. Other examples of epoxide reactive diluents are styrene oxide; octylene oxide; aliphatic epoxides having the epoxide group on terminal carbon, such as those derived from $C_7$–$C_9$ α-olefins. Aliphatic diepoxide, such as the diglycidyl ether of butane diol, can also be used.

In general, the proportion of reactive diluent component of the epoxy resin-reactive diluent solution will vary depending on the molecular weight or viscosity of the epoxy resin component, viscosity being a function of the molecular weight. Thus, as the molecular weight of the resin increases, and hence its viscosity, more diluent will be required to effect the desired degree of viscosity. On the other hand, as the temperature of the formation increases a lesser quantity of reactive diluent will be required to effect the required viscosity requirement. As has already been indicated, the mixture of epoxy resin and reactive diluent can consist essentially of 40 to 95% epoxy resin having a molecular weight in the range of 400 to 700, and from 5 to 60%, preferably about 15 to 35%, of reactive diluent, the percentages being by weight. As a specific example, an epoxidized novolac having a molecular weight of 450 and a viscosity of 1800 centipoises at 125° F., when mixed with 20% styrene oxide will give a solution having a viscosity of 325 centipoises at 76° F., and of 40 centipoises at 150° F.

In carrying out the invention, it is desirable that the epoxy resin component have an initial viscosity, before mixing with the reactive diluent, above about 400 centipoises at the temperature of the formation. The use of such viscous resin component results in a consolidated mass of greater compressive strength. However, it is also desirable that in carrying out the process the viscosity of the solution be below about 400 centipoises at the temperature of the formation.

When proceeding as thus suggested, it has been found that the resin solution can be injected into the formation at reasonable pumping rates without causing fracturing, for example, ½ barrel of resin solution per hour per vertical foot of formation to be treated at a pumping pressure of 2,000 p.s.i. Moreover, operating viscosities below about 400 centipoises permit the flushing fluid to disperse the resin uniformly through the sand formation, thus minimizing channeling.

A particularly useful aspect of the invention is that it permits satisfactory treatment of unconsolidated oil-producing formations that can vary widely in temperature, including low-temperature consolidation below a temperature of about 150° F. down to 76° F., and high temperature sand consolidation exceeding a temperature of about 150° F. up to 250° F. and higher.

In addition to the viscosity requirements outlined above, it is important that the curing of the resin occurs over a wide temperature range. Accordingly, a suitable epoxy resin component of the plastic mixture is one that contains the preferred epoxy novolac resin illustrated above, alone, or admixed with another type such as one derived from bisphenol A and epichlorohydrin. As stated, the preferred epoxy novolac resin contains at least two epoxy groups in primary position. The use of such resin results in good cure, thus producing a consolidated mass of high compressive strength throughout a broad temperature range. An additional benefit flowing from the use of the preferred epoxy novolac resin is that the compressive strength of the consolidation can be retained to a satisfactory degree when the treatment is applied to briny wells, that is, where brine is present in the oil-producing formation.

In the placing of the plastic mixture or solution of epoxy resin and reactive diluent in the formation to be treated, the mixture is caused to permeate the formation by pumping it into the formation through the borehole traversing the formation. Generally, sufficient mixture is injected into the formation to impregnate it to a radial distance of a few inches to 5 or more feet from the well bore, that is, in an amount of 2 to 60 gallons of mixture per vertical foot of well hole in the formation to be treated, a generally satisfactory amount being about 1 barrel (42 gallons) per vertical foot.

In a preferred embodiment of the invention, the unconsolidated formation is pretreated with a water-removing liquid to remove water from the sand grains and thus render them preferentially wettable with the resinous mixture rather than with water.

For this purpose, it is preferred to use an organic solvent which removes water from the formation by miscible displacement. The solvent can then be displaced by the resin or a miscible oil flush before resin injection. Suitable solvents are those which are miscible with brine and either resin or oil. These include low molecular weight ketones, such as acetone and methyl ethyl ketone; aldehydes, such as acetaldehyde, isobutyraldehyde, and formaldehyde; alcohols, such as methanol, ethanol, propanol, isopropanol, isobutanol, and tertiary butyl alcohol; ethers, such as methyl propyl ether, isopropyl ether, and n-butyl ether. The volume of preflush fluid used is generally ⅓ to five times the pore volume of the formation to be consolidated, generally 1 to 15 barrels per vertical foot of borehole traversing the formation to be treated.

Also useful for the removal of water from the formation are commonly available surfactants, such as sulfonated naphthenic acids, sulfonated higher alcohols and hydrocarbons, quaternary ammonium salts, silicones, and heavy metal soaps. The surfactant can be mixed directly with the resin mixture of epoxy resin and reactive diluent, or can be mixed with oil, water, or other fluids and introduced into the formation as an independent preconditioning step prior to the injection of the resin mixture. Generally, an amount of surfactant ranging from 0.01 to 1% by weight based on resin mixture is satisfactory.

When the formation has been treated with the aforesaid resin solution to the extent indicated, a flushing fluid is forced therethrough to extract the reactive diluent and to render the formation permeable, while leaving a film of the cementing resin on the surfaces of the particles sufficient to bind the loose particles into an aggregate mass. Considerable latitude is possible in the injection of flush fluid ranging from immediate application, after the resin is placed, to a delay of several days. The advantage of such flexibility will be readily apparent to those engaged in completing oil wells.

A suitable flushing fluid is an aliphatic or nonaromatic hydrocarbon oil, relatively free of unsaturated hydrocarbons, which is a solvent for the reactive diluent, but is immiscible with the epoxy resin component. Examples of suitable flushing fluids are kerosene, diesel oil, and the refined petroleum oils, free of aromaticity and of olefinic hydrocarbons, known as the white oils. An amount of flushing fluid which is at least equal to the volume of resin mixture injected, up to 10 volumes of the resin mixture, will in most cases be satisfactory, the preferred amounts being 1.5 to 4 volumes of flushing fluid per volume of the original resinous mixture introduced.

After the formation has been flushed, there is then injected into it a curing agent to transform the thermoplastic resin film on the particle surfaces to the thermoset, tough solid state. The curing agent also reacts with residual reactive diluent present in the resin, thus to give a stronger bond than would be obtainable if a non-reactive diluent were employed.

A number of curing agents or activators or catalysts are suggested in the art to harden the unset resin. These include amines, dibasic acids, and acid anhydrides. In accordance with the present invention, the preferred class of hardeners or curing agents are the amines, including primary, secondary, or tertiary amines and mixtures thereof. Examples are primary aliphatic amines, such as diethylene triamine, ethylene diamine, triethylene tetramine, dimethylamino propylamine, and diethylamino propylamine; cyclic aliphatic amines, such as piperidine, menthane diamine; tertiary amines, aliphatic or aromatic substituted derivatives, such as triethyl amine, benzyl dimethylamine, dimethylamino methyl phenol, tridimethyl amino methyl phenol, and α-methylbenzyl dimethylamine; aromatic amines, such as meta-xylylene diamine, 4,4'-methylene dianiline, and pyridine.

As indicated, a mixture of the various amines is preferred. A mixture of primary and tertiary amines is even more preferred. This can be a physical mixture of two or more compounds, such as benzyl dimethylamine and diethylene triamine; or a single compound containing both primary and tertiary amine groups, as represented by dimethyl aminopropyl amine.

In low-temperature sand consolidation treatment, i.e., at temperatures below about 150° F., using the hereinabove specified novolac resin, the amine curing agent selected is one which is effective at these lower temperatures. Accordingly, good results are obtained when the curing agent is an aliphatic primary-tertiary amine, such as dimethylamino propylamine or diethylamino propylamine; or a phenolic tertiary amine, such as dimethyl amino methylphenol or tri-(dimethylaminomethyl) phenol.

The catalyst is introduced into the formation following the flushing operation by injecting a solution of the catalyst in a solvent such as the oil used for flushing, the total volume of this latter mixture being again at least equal to the volume of original resin mixture introduced into the formation. The amount of catalyst used can vary from 0.1 to 10 percent, preferably around 2 percent by weight based on the mixture of epoxy resin and diluent.

The effectiveness of the method herein contemplated is borne out by the following tests and examples.

For testing there was used a Hassler cell. It comprised a rubber tube, adapted to be fitted with end plugs, provided with screened inflow and outflow openings to prevent loss of sand under pressure, and to permit the flow of fluids through the sand packed in the rubber tube, the plugs being further adapted to be hermetically fastened to a metallic sleeve. The sleeve and rubber tube were of such dimensions as to hold a sand sample, of 5 feet long by 1 inch in diameter. The sleeve is provided with means for exerting pressure on the sand pack (analogous to the pressure on an incompetent formation from the earth above it, known as overburden pressure). Additional equipment comprises a pressure tank for storage of fluids prior to their injections, a pump to force the fluid through the sand pack, a bath for heating the Hassler cell, and means, such as a graduate cylinder or flask, to measure the outflow of fluids. After the final injection of the last fluid, the openings of the plugs are closed (shut in) and the treated sand pack allowed to cure.

Nevada sand, 95% passing a 100 mesh screen and having grains of irregular size and shape, was placed in the rubber tube and compacted by vibrating for 15 minutes. Overburden pressure was held at 2,500 p.s.i., at the indicated temperatures, to simulate the conditions of a formation penetrated by a borehole. Diesel oil was flowed through the sand pack to saturate it with the oil. At this point, permeability in darcys was determined. Following the oil saturating step, there was next injected the resin solution, followed by flushing with diesel oil. After the flushing step, a catalyst-containing solution was injected and curing of the resin was effected.

*Example 1*

Epoxylated novolac resin having an average molecular weight of 640, a viscosity of 19,000,000 centipoises at 76° F., and an epoxide equivalent of 178 was mixed in equal parts by weight with an epoxy of diglycidyl ether of bisphenol A having an epoxide equivalent of 173–179, an average molecular weight of 340–350, and a viscosity of 3,600–6,400 centipoises at 76° F.

To this mixture of epoxy resins there was added styrene oxide in an amount of about 35% by weight based on it to give a solution having a viscosity of about 240 centipoises at 76° F.

300 cc. of diesel oil was pumped through the sand pack of the Hassler cell maintained at about 76° F. over a period of 1 hour and 25 minutes. To the oil-saturated sand, there was then injected 140 cc. of the above resin mixture over a period of about 3 hours. The resin-treated sand pack was then flushed with 500 cc. of diesel oil, the flushing step requiring about 140 minutes. Following the flushing step, there was then pumped through the sand 400 cc. of a diesel oil solution containing 5% of dimethylaminopropylamine curing agent, the operation requiring about 105 minutes.

The Hassler cell was then shut in and allowed to set overnight at room temperature (76° F.) and at a pressure of 1,000 p.s.i.

The following day, permeability of the sand core using diesel oil was determined to be 1.10 darcys or 45% of the original.

When the core was removed from the cell, it was found to be completely and uniformly consolidated, with no visible channeling. No evidence of plugging was noted. Average compressive strength based on representative samples was determined to be 8,690 p.s.i.

*Example 2*

In this example, substantially the same procedure was followed as in Example 1. The epoxy resins were mixed with 30 percent of butyl glycidyl ether to give a resin solution having a viscosity of 240 centipoises at 76° F. Following saturation with oil, 130 ml. of the solution was pumped through the sand. Flushing and curing as in Example 1 resulted in a sand core having a permeability of 0.97 darcy or approximately 36% of the original, and an average compressive strength of 8,520 p.s.i.

*Example 3*

An epoxylated novolac resin having an average molecular weight of 425, a viscosity of about 5,000 centipoises at 150° F., and an epoxide equivalent of 180 was mixed with octylene oxide in an amount of about 20% by weight based on the mixture to give a solution having a viscosity at 160 centipoises at 135° F.

The sand pack of the Hassler cell was oil-saturated at 135° F. To the oil-saturated sand was injected 100 cc. of the above resin mixture over a period of about one hour. The resin treated sand was then flushed with 1,000 cc. of No. 5 white oil, which required about 3 hours. Following the flushing step, 200 cc. of a white oil solution containing 20% of dimethyl aminomethyl phenol was injected, the operation requiring about 1 hour.

The Hassler cell was then shut in and allowed to set overnight at 135° F. and about 2,500 p.s.i. pressure.

The following day, the sand core had a permeability of 0.55 darcy or 26% of the original permeability.

Representative consolidated core samples 1½ inches long were tested for initial strength and aging characteristics. The initial strength was determined to be 8,890 p.s.i.

To determine aging or durability, the boiling brine test was used. According to this test the test samples are placed in racks and lowered into tanks containing a boiling brine solution (2.5% NaCl solution). Different samples remain in the boiling brine solution from 10 to 360 days. At the end of the time period, the samples are removed and compressive strengths determined.

For the 360-day samples of Example 3, the strengths were determined to be 4,600 p.s.i.

Similar core samples consolidated with a typical phenol-formaldehyde sand consolidating resin obtained by the acid catalyzed reaction of phenol and formaldehyde had no compressive strength after 15 days.

*Example 4*

An epoxy resin derived from bisphenol A and epichlorohydrin, and the epoxy resin described in Example 3, were mixed with octylene oxide and methyl Nadic anhydride (methyl dicyclo-(2,2,1)-5-heptene - 2,3 - dicarboxylic anhydride). The epoxy resin derived from bisphenol A had a molecular weight of 350 to 400 and an epoxide equivalent of 175–210. The resulting mixture contained the following weight percent of each component:

| | Percent |
|---|---|
| Epoxylated novolac resin | 28.6 |
| Bisphenol A epoxy resin | 14.3 |
| Octylene oxide | 14.3 |
| Methyl "Nadic" anhydride | 42.8 |

In this example, substantially the same procedure was used as in Example 3.

The Hassler cell was shut in and allowed to set overnight at 200° F. and 1,000 p.s.i. pressure.

The following day the core was determined to have a permeability of 1.61 darcys or 63% of the original permeability and a compressive strength of 7,000 p.s.i.

The various fluids, including the resin-diluent mixture, may be injected into the formation through a piping stringer or producing tubing placed in the well bore provided with a casing. The formation to be treated may be isolated by positioning a packer just above it, and a packer just below it. Perforations are made in the casing between the packers to provide fluid intercommunication between formation, cased well bore, and tubing.

In accordance with a preferred embodiment of the invention, the tubing is filled with an inert fluid, such as diesel oil or fluid like that to be produced. The fluid in the tubing serves to establish initial injection, i.e., by its use pumpability of the subsequent fluids into the formation can be determined, and any undesirable fluids in the formation to be treated are displaced.

Treatment then continues by pumping into the tubing the following fluids in sequence, each succeeding fluid pushing the preceding one out into the formation:

(1) A suitable agent, such as acetone, capable of removing water from the sand grains and of rendering them preferentially wettable by epoxy resin.

(2) A fluid capable of washing the acetone from the tubing and thus preventing it from diluting the epoxy resin, a quantity similar to that of the acetone being satisfactory. This fluid is a hydrocarbon oil, such as diesel or crude petroleum oil, in which the acetone is soluble and epoxy resin is insoluble.

(3) Epoxy resin-reactive diluent mixture.

(4) Flushing fluid for dispersion of the resin-reactive diluent mixture throughout the formation.

(5) Activator or curing agent solution. The activator solution is forced into the formation by a liquid such as diesel or salt water, which later is permitted to fill the tubing and then to provide a hydrostatic head which is at least equal to the formation pressure and thereby preventing the injected fluid from being forced back into the borehole.

In practice, the various fluids are pumped into the tubing at a fast rate consistent with the equipment used and the objectives desired. Accordingly, the plastic-reactive diluent mixture is injected at a rate sufficiently controlled to effect uniform dispersion of it throughout the formation. It has been found that a resin mixture rate of injection of about ⅒ barrel to 5 barrels, preferably ½ barrel to 1 barrel, per hour per linear foot of borehole opposite the formation to be treated is satisfactory. The other fluids can be injected at a rate equal to that of the resin mixture ranging up to 20 times this rate, a good operable rate being about 6 times that of the resin.

It is also desirable to keep the various fluids separate in the tubing, and minimize intermixing. It is particularly desirable that the resin-reactive diluent mixture be forced into the formation relatively uncontaminated. This can be effected by the use of separation means, such as sweep plugs, that keep the various fluids separated. Therefore, it will often be advantageous to insert sweep plugs into the tubing just before and after the plastic-reactive diluent mixture is pumped into the tubing.

The following example illustrates low temperature sand consolidation of an unconsolidated earth formation.

*Example 5*

In the Louisiana Gulf Coast area a well was completed offshore in a typical miocene formation that had exhibited severe sand problems in other wells nearby. The temperature of the formation was 138° F. A 5 foot interval of the cased borehole, extending from about 5,200–5,205 feet down the well, was perforated and isolated by means of packers. A producing tube having a capacity of approximately 30 barrels was installed. The tubing was filled to capacity with 30 barrels of diesel oil. 15 barrels of acetone were pumped into the tubing, thus displacing 15 barrels of diesel oil from the tubing into the formation. Next there was pumped into the tubing 10 barrels of diesel fuel to wash out the acetone from the tubing and prevent mixing with resin in the next step, a total of 25 barrels of diesel oil being thus forced out into the formation. At this stage a sweep plug was inserted in the tubing, after which 5 barrels of the epoxy-reactive diluent plastic mixture were added to the tubing. The sweep plug serves to keep diesel introduced in the previous step separate from the resin mixture. The epoxy resin component of the plastic mixture was an epoxidized novolac resin having a molecular weight of 425 and an epoxide equivalent of 178. The reactive diluent was styrene oxide, present in an amount of 20 percent, by weight, the epoxy resin being present in an amount of 80% by weight.

Pressuring of the plastic mixture caused a displacement out into the formation of 30 barrels of diesel oil. At this point another sweep plug was installed to isolate the resin mixture from subsequent fluids. 15 barrels of diesel were then injected into the tubing displacing 15 barrels of acetone from the tubing into the formation. 15 barrels of activator solution containing 5 percent dimethyl amino propylamine in diesel were then injected into the tubing.

The activator solution and flushing diesel oil fluid before it were forced into the formation by pressuring with 30 barrels of drilling fluid (salt water). When the resin solution was at the bottom of the tubing, i.e., after 10 barrels of the activator solution had entered the tubing, the pumping rate was slowed to ½ barrel per hour per linear foot in order to obtain good distribution of the resin mixture into the formation. After resin injection, the pumping rate of the subsequent fluids into the formation was increased to 3 barrels per linear foot.

At the end, the tubing contained 30 barrels of salt water, thus forming a hydrostatic head for the formation. The formation contained 30 barrels of diesel oil, 15 barrels of acetone, 10 barrels of diesel oil, 5 barrels of resin, 15 barrels of diesel oil, and 15 barrels of activator solution. The well was shut in for a period of 4 hours after which production was initiated from the treated zone.

For ready understanding, the steps involved in this example, showing the location of the various fluids in the tubing and in the formation, may be summarized as follows. The numerals refer to barrels.

|  | Tubing | Formation |
|---|---|---|
| I | 30 Diesel | |
| II | 15 Acetone / 15 Diesel | 15 Diesel. |
| III | 10 Diesel / 15 Acetone / 5 Diesel | 25 Diesel. |
| IV | 5 Resin / Sweep Plug / 10 Diesel | 30 Diesel. |
| V | 15 Acetone / 15 Diesel / Sweep Plug / 5 Resin / Sweep Plug / 10 Diesel | 30 Diesel, 15 Acetone. |
| VI | 15 Activator¹ / 15 Diesel | 40 Diesel, 15 Acetone. 5 Resin. |
| VII | 30 Drilling Fluid / Hydrostatic Head | 55 Diesel, 15 Acetone. 5 Resin, 15 Activator. |

¹ When 10 barrels of activator had been injected, resin solution was introduced at a rate of 2½ barrels per hour, the other fluids having been injected at a rate of 15 barrels per hour.

We claim:

1. Method of consolidating an incompetent earth formation of loose sand particles traversed by a borehole, which comprises injecting through said borehole into said earth formation a mixture comprising, by weight, about 40 to 95% of an epoxy resin having a molecular weight of about 400–700 and a viscosity at the temperature of the earth formation above about 400 centipoises, and a normally liquid reactive diluent in an amount within about the range 5 to 60% to reduce the viscosity of the epoxy resin below about 400 but above about 25 centipoises at the temperature of the earth formation; flushing the treated formation with a flushing fluid that is substantially immiscible with said epoxy resin but is miscible with the reactive diluent to impart permeability to the treated formation by displacing the epoxy retsin while leaving a film of epoxy resin around the sand particles and to extract the reactive diluent; then contacting said epoxy resin film with a curing agent to harden the resin.

2. Method according to claim 1 wherein the epoxy resin is epoxidized novolac.

3. Method according to claim 2 wherein the curing agent is an amine.

4. Method according to claim 3 wherein the reactive diluent is styrene oxide.

5. Method of consolidating an incompetent earth formation of loose sand particles traversed by a borehole by cementing them together with epoxy resin, which comprises injecting separately through said borehole into said formation the following materials in sequence:

(1) a water-removing liquid to render the formation preferentially wettable by the epoxy resin;

(2) an epoxy resin mixture comprising, by weight, about 40 to 95% of an epoxy resin having a molecular weight of about 400–700 and a viscosity above about 400 centipoises at the temperature of the earth formation, and a normally liquid reactive diluent in an amount within about the range 5 to 60% to reduce the viscosity of the resin below about 400 but above about 25 centipoises at the temperature of the earth formation;

(3) a flushing fluid that is substantially immiscible with said epoxy resin but is miscible with the reactive diluent to impart premeability to the treated formation by displacing the epoxy resin while leaving a film of epoxy resin around the sand particles and to extract the reactive diluent; and (4) a curing agent to harden the resin.

6. Method according to claim 5, wherein the reactive diluent is present in the epoxy resin mixture in an amount of about 15 to 35%.

7. Method according to claim 6, wherein the water-removing liquid is acetone and the curing agent is an amine.

8. Method according to claim 7, wherein the amine curing agent is a mixture of primary and tertiary amines and the epoxy resin is an epoxidized novolac resin.

9. Method according to claim 5, which includes injecting through the borehole and into the formation: the water-removing liquid in an amount of 1 to 5 times the pore volume of the formation to be treated; the epoxy resin mixture, in an amount of 2 to 60 gallons per verticai foot of well hole in the formation to be treated; and the flushing fluid, in an amount of 1.5 to 4 volumes per volume of the epoxy resin mixture.

10. Method according to claim 9, wherein the water-removing liquid is acetone.

11. Method according to claim 9, wherein the reactive diluent is present in the epoxy resin mixture in an amount of 15 to 35%, the epoxy resin is epoxidized novolac and the curing agent is a mixture of primary and tertiary amines.

12. Method according to claim 11, wherein the temperature of the formation is below about 150° F.

13. Method of consolidating an oil-producing earth formation of loose sand particles traversed by a borehole provided with producing tubing having fluid intercommunication with said formation, which comprises filling said tubing with an inert hydrocarbon fluid to establish initial injection, and then effecting the following operations in sequence:

(1) pumping into the tubing and into the formation a water-removing liquid to render the formation preferentially wettable by epoxy resin;

(2) pumping into the tubing and into the formation an epoxy-resin immiscible hydrocarbon fluid to wash the water-removing liquid from the tubing;

(3) pumping into said tubing and into the formation an epoxy resin-reactive diluent mixture, said mixture containing, by weight, about 40 to 95% of an epoxy resin having a molecular weight of about 400–700 and a viscosity at the temperature of the earth formation above about 400 centipoises, and a normally liquid reactive diluent in an amount within about the range 5 to 60% to reduce the viscosity of the epoxy resin below about 400 but above about 25 centipoises at the temperature of the earth formation;

(4) pumping into the tubing and into the formation a flushing fluid to spread the epoxy resin-reactive diluent mixture through the formation and thus provide permeability, said flushing fluid being immiscible with the epoxy resin, but miscible with the reactive diluent;

(5) pumping into said tubing and into the formation a solution of an epoxide resin curing agent capable of reacting with the reactive diluent; and (6) maintaining within said tubing a hydrostatic head at least equal to the fluid pressure in the treated formation.

14. Process according to claim 13, wherein the water-removing agent is acetone.

15. Process according to claim 14, wherein the reactive diluent is styrene oxide.

16. Process according to claim 13, which includes pumping the epoxy resin-reactive diluent mixture into the formation at a rate of about ½ barrel to 1 barrel per hour per vertical foot of borehole traversing the formation.

17. Process according to claim 16, wherein the epoxy resin is an epoxidized novolac resin.

18. Process according to claim 17, wherein the water-removing liquid is acetone, and the epoxy resin curing agent is a mixture of primary and tertiary amines.

19. Process according to claim 17, wherein the amine curing agent is dimethylaminopropylamine.

20. Process according to claim 19, wherein the reactive diluent is octylene oxide.

References Cited by the Examiner

UNITED STATES PATENTS

| | | | |
|---|---|---|---|
| 2,252,271 | 8/41 | Mathis | 166—33 |
| 2,378,817 | 6/45 | Wrightsman | 166—33 |
| 2,823,753 | 2/58 | Henderson | 166—33 X |
| 3,047,067 | 7/62 | Williams et al. | 166—33 |
| 3,100,527 | 8/63 | Hilton et al. | 166—33 |

FOREIGN PATENTS 230,393   9/60   Australia.

CHARLES E. O'CONNELL, *Primary Examiner.*

UNITED STATES PATENT OFFICE
CERTIFICATE OF CORRECTION

Patent No. 3,176,768                       April 6, 1965

Harry Brandt et al.

It is hereby certified that error appears in the above numbered patent requiring correction and that the said Letters Patent should read as corrected below.

Columns 1 and 2, lines 14 to 18, for the right-hand portion of the formula reading

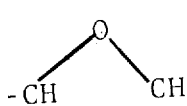      read      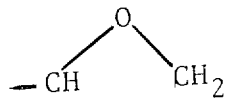

column 5, line 37, for "4.4′-" read -- 4,4′- --; column 9, line 63, for "retsin" read -- resin --; column 10, line 16, for "premeability" read -- permeability --.

Signed and sealed this 26th day of October 1965.

(SEAL)
Attest:

ERNEST W. SWIDER
Attesting Officer

EDWARD J. BRENNER
Commissioner of Patents